Feb. 17, 1942.   E. W. AUSTIN   2,273,010
EARTH MOVER
Filed Nov. 1, 1937   9 Sheets-Sheet 2

INVENTOR.
Ellsworth W. Austin
BY Marcus Lothrop
ATTORNEY.

Feb. 17, 1942. E. W. AUSTIN 2,273,010
EARTH MOVER
Filed Nov. 1, 1937 9 Sheets-Sheet 4

INVENTOR.
Ellsworth W. Austin
BY Marcus Lothrop
ATTORNEY.

FIG_12_

FIG_13_

Feb. 17, 1942.  E. W. AUSTIN  2,273,010
EARTH MOVER
Filed Nov. 1, 1937  9 Sheets-Sheet 9

_FIG_19_

INVENTOR.
Ellsworth W. Austin
BY Marcus Lothrop
ATTORNEY.

Patented Feb. 17, 1942

2,273,010

UNITED STATES PATENT OFFICE 2,273,010

EARTH MOVER

Ellsworth W. Austin, Cedar Rapids, Iowa, assignor to La Plant-Choate Manufacturing Company, Incorporated, Cedar Rapids, Iowa, a corporation of Delaware Application November 1, 1937, Serial No. 172,094

9 Claims. (Cl. 37—126)

My invention relates to means intended to be utilized in gathering, conveying and discharging material such as earth, when propelled by a tractor or other suitable draft implement. Devices of this general character are disclosed in my Patents Nos. 2,203,713 and 2,204,033 which issued on June 11, 1940.

It is in general an object of my invention to provide an improved earth mover.

Another object of my invention is to provide an earth mover in which a main bowl is movable with respect to the main frame in a manner greatly to facilitate the loading and filling of the main bowl with earth.

Another object of my invention is to provide an earth mover in which large ground clearance is available when the mover is in its carrying position.

Another object of my invention is to provide an earth mover hoving a very large earth capacity yet which is positively discharged.

Another object of my invention is to provide an earth mover in which the relationship of the main bowl with respect to the main frame is variable transversely of the structure.

The foregoing and other objects are attained in the embodiments of the invention illustrated in the drawings, in which—

Fig. 18 is a side elevation showing the arrangement of the remotely operated hydraulic valve control.

In its preferred form, the earth mover of my invention includes a structure adapted to be moved over the ground, preferably by a draft vehicle, and incorporates an articulated supporting frame on which there is movably mounted a main earth-receiving bowl provided with an earth barrier movable through the bowl to discharge the contents thereof and provided with a front apron movable to receive, retain and assist in discharging earth, the main bowl and its appurtenant barrier and front apron being related to the main frame so that they are movable transversely of the main frame and so that they may be related to the earth over which they are passing in such a fashion as to afford a large clearance when elevated and to engage the earth at a very small angle when in digging position. The earth-moving instrumentalities are preferably actuated by hydraulic mechanisms all of which are preferably brought under selective remote control of the operator of the draft vehicle.

In the form of the invention disclosed in the drawings herein, the earth mover is preferably propelled by any suitable draft vehicle, such as a tractor 6, to which it is connected by a draft hitch 7. The draft hitch has a pivotal connection 8 to a steering axle 9 at its ends forming journals for a pair of ground-engaging front wheels 11. A horizontal swivel pin connection 12 and a vertical swivel pin 13 articulate the axle 9 with a front frame portion 14 included in the main frame 15 of the structure.

As a characteristic of the present invention, the main frame is formed of two portions 14 and 16 articulated or jointed with respect to each other in order that the portion 16 may be substantially moved with respect to the ground 17. The main frame, particularly the portion 16 thereof, is further supported on the ground 17 by a pair of rear wheels 18, each of which is mounted upon a spindle 21 fastened to an adjacent pair of plates 22. The plates 22 are connected together by closure plates 23 to form a box-like rearward extension of the frame portion 16. The lower, rearward portion of each box member is pierced to receive a vertical attaching pin 24 by which a transverse tow-bar 26 is detachably held to act partially as a lateral reinforcement and partially as a point of attachment for a following vehicle. Suitably pierced ears 27 on the tow-bar 26 form a hitch connection, so that the tractor 6 can draw not only the vehicle disclosed in Fig. 1 but also a different or comparable trailing vehicle attached thereto in tandem.

Reinforcement in addition to that of the tow-bar is provided by a box beam 28 fabricated of a pair of channel irons spanning the space between the box members 22 and incorporated by a pair of gussets 29. Forwardly of the box members 22 and of the beam 28, the portion 16 of the main frame incorporates side rails 31 and 32, made preferably of opposed channels and extending forwardly to depending forks 33 and 34 each of which is pierced by one of a pair of pivot pins 36. Engaging the pins are levers 37 and 38 secured to the rearward and lateral extremities of a yoke 39 diverging from a central column 41 which, with the yoke and levers, is included in the frame portion 14.

In order that the front portion 14 of the frame may be articulated or "jack-knifed" with respect to the rear portion 16 of the frame about the transverse axis defined by the aligned pins 36, I provide a power means connected to the two frame portions for such purpose. Preferably, this takes the form of an expansible chamber actuated by hydraulic fluid and includes a cylinder 42 having thereon oppositely extending trunnions 43 journaled in a pair of ears 44 upstanding from a cross-beam 46. The beam 46 is centrally reinforced by a filler block 47 and wing plates 48 and at its ends is supported on uprights 49 mounted on the side rails 33 and 34 and reinforced by gussets 51.

Figures 1, 2:
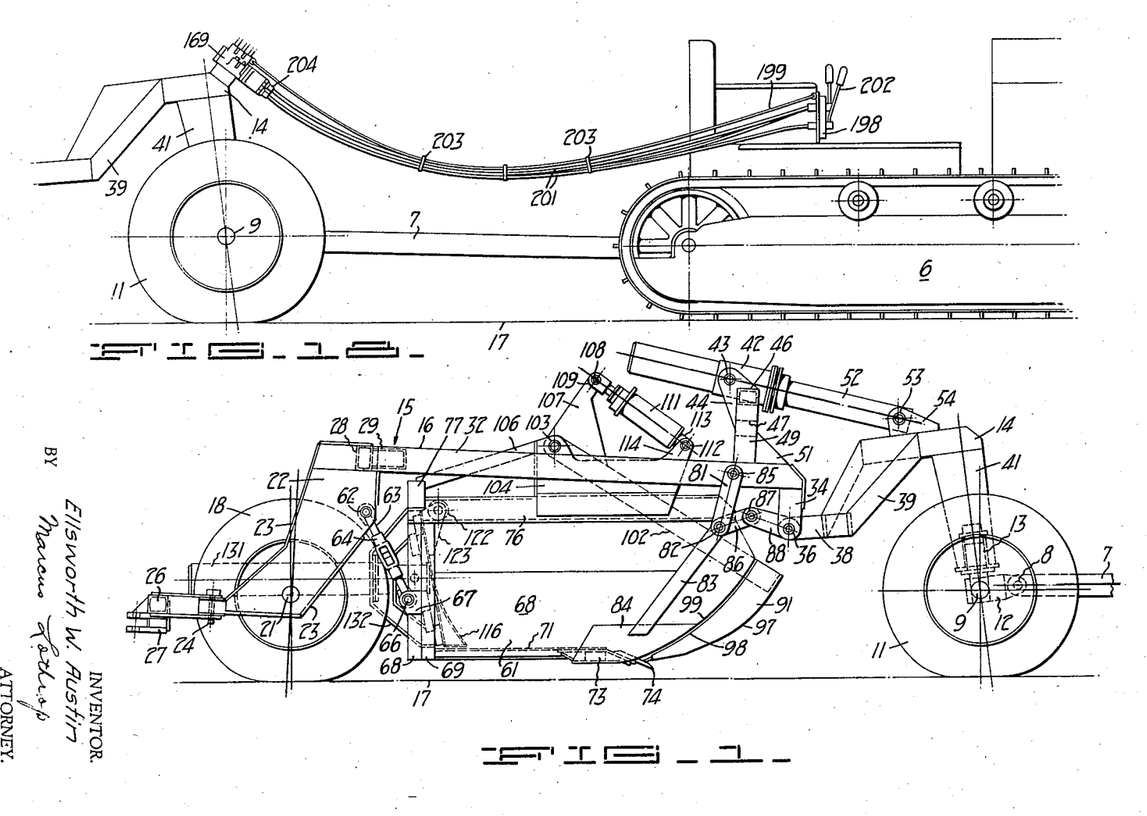
Fig. 1 is a side elevation of an earth mover constructed in accordance with my invention.
Fig. 2 is a plan of the earth mover shown in Fig. 1, portions of the figure being omitted to permit of an enlarged scale.
Figure 2:
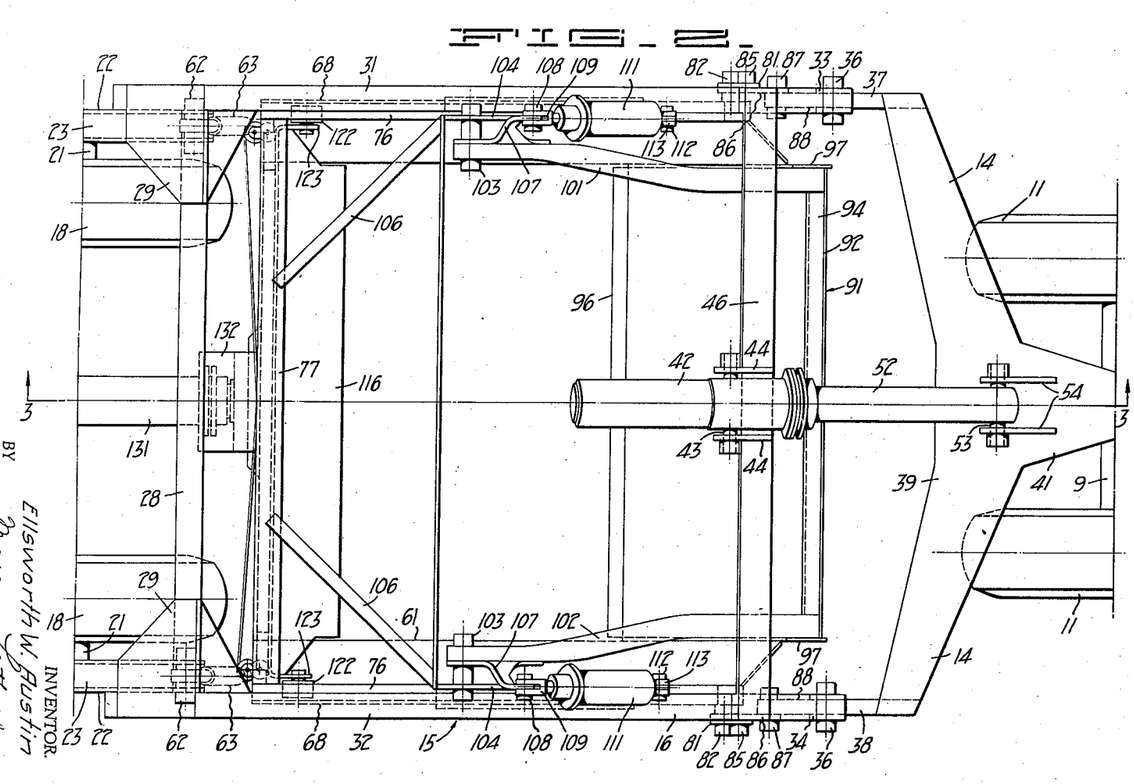
Figure 3:
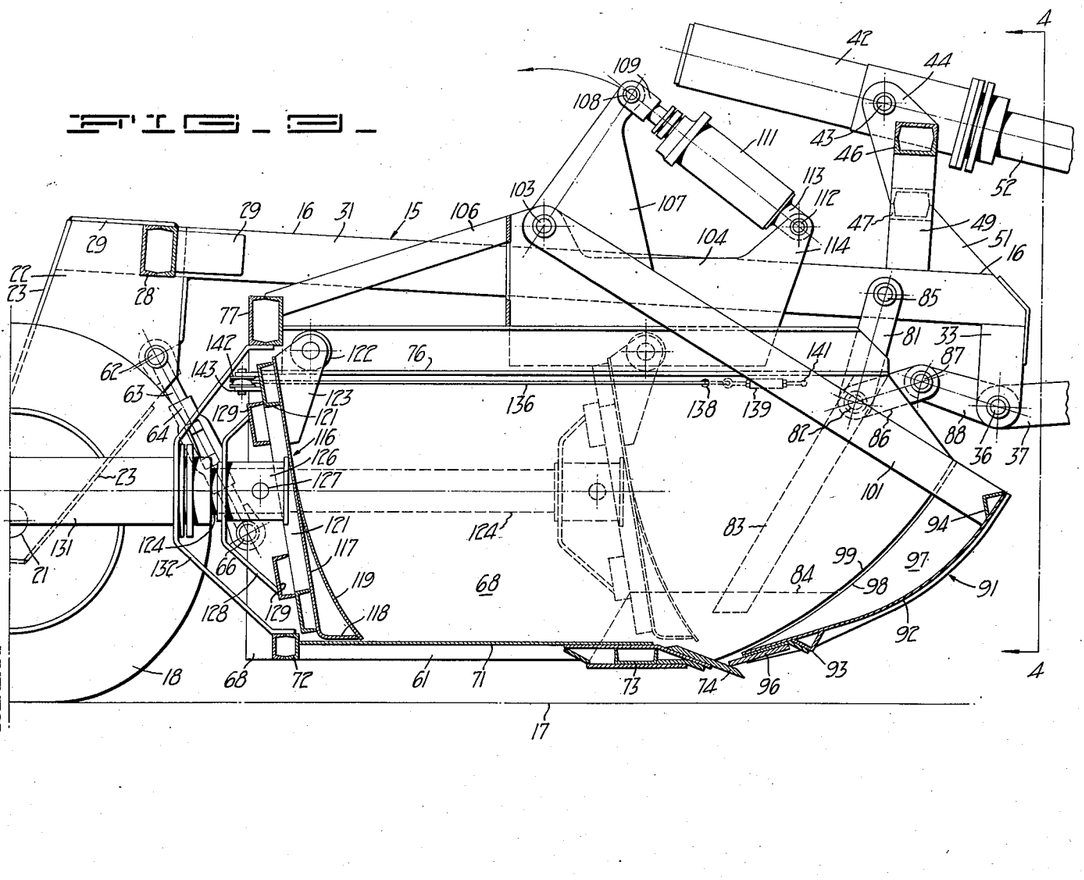
Fig. 3 is a cross-section the plane of which is indicated by the line 3—3 of Fig. 2.
Figure 4:
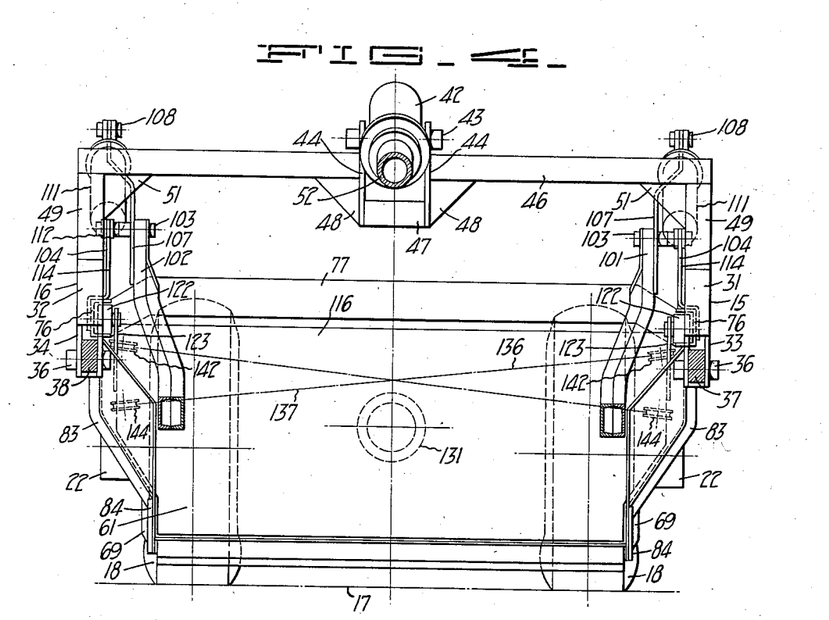
Fig. 4 is a cross-section the plane of which is indicated by the line 4—4 of Fig. 3.

Adapted to reciprocate within the cylinder 42 is a plunger 52 having a cross-pin 53 journaled in a pair of plates 54 mounted on the central portion of the yoke 39. When hydraulic fluid is forced into the cylinder 42 the plunger 52 is forced outwardly of the cylinder, thus raising the axis of the pivot pins 36 with respect to the ground 17, and in effect rotating the frame portion 14 about the axis of the wheels 11 in a clockwise direction as seen in Fig. 1, and rotating the frame portion 16 about the axis of the wheels 18 in a counter-clockwise direction as seen in Fig. 1. This partial relative rotary movement of the two frame portions 14 and 16 is accompanied by an approaching and receding movement of the front pair of wheels, so that during vertical articulation of the main frame the wheel base of the structure varies in accordance therewith. By controlling the flow of hydraulic fluid to and from the cylinder 42, the operator can raise and lower the main frame with respect to the ground, can alter the wheel base of the vehicle, and can readily change the relative angle or inclination of the main frame portions 14 and 16 with respect to each other and with respect to the ground 17.

In accordance with my invention I preferably provide an earth-carrying main bowl 61 between the front and rear pairs of wheels, and preferably support the main bowl 61 on the frame portion 16. Extending from a pivotal connection 62 between the plates of each of the box members 22, there is an extensible link 63 including a threaded turnbuckle 64 and terminating in a pivotal connection 66 with a pair of brackets 67 on the main bowl 61. Each of the pairs of brackets 67 is united to the trailing portion of an adjacent side plate 68 of the main bowl which is locally reinforced by a vertical channel 69. The lower portions of the side plates 68 are joined by a bottom plate 71, the rearward part of which is reinforced by a pair of nested channels 72 spanning the distance between the side plates 68, and the forward part of which is provided with reinforcement 73 to receive a removable serrated cutting edge 74. The upper, generally horizontal edges of the side plates 68 are each stiffened by longitudinally extending, inwardly facing channels 76 which at their rearward terminals are joined by a spanning member 77.

By operation of the turnbuckles 64 on opposite sides of the earth mover in the same direction and in unison, the general elevation of the rear end of the main bowl 61 is altered with respect to the ground 17, remaining, however, parallel to the axis of the rear wheels 18. If the turnbuckles 64 are operated different amounts or in different directions, then the respective parts of the rear portion of the main bowl are either raised or lowered and, in consequence, the main bowl is given an inclination or angle transversely of the earth mover, there being sufficient flexibility in the structure to admit of the described crosswise tipping. In other words, one side of the main bowl may be adjusted to retain a position closer to the ground than the other side.

The forward portion of the main bowl 61 is so mounted as to take advantage of the link mounting of the rear portion of the bowl, so that the bowl can be moved with respect to the main frame not only to assume positions in consonance with the positions of the main frame but likewise to augment and increase the movement due to the main frame. The forward portion of the main bowl is provided at each side with a link 81, the lower end of which is connected by a pivot pin 82 to a portion of the associated side plate 68 which is reinforced by a member 83 extending to a corner reinforcement 84. The upper end of the link 81 is connected by a pivot pin 85 to the associated one of the side rails 31 and 32. The links 81 are not parallel with the links 63 in the particular embodiment of my invention illustrated, so that as the links 81 are oscillated about their pivotal points 85 they produce a comparable oscillation of the links 63 in such a fashion that there is a pronounced vertical component to the movement of the rear part of the main bowl, with only a slight vertical component to the movement of the forward portion of the bowl. In this way, as the links 81 oscillate, the rear portion of the bowl 61 is raised and lowered an appreciable amount.

In order to oscillate the links 81 under the control of the operator, I preferably provide connectors 86 each of which at one end engages a pivot pin 82 and at the other end is connected by a pin 87 with an extension 88 from one of the members 37 and 38, respectively, so that as the front portion 14 of the frame is moved about the articulation pivots 36, the extension 88 transmits a comparable movement through the connectors 86 to the pivots 82. Thus, as the main frame is jack-knifed, or its two portions 14 and 16 are moved with respect to each other, the main bowl 61 is moved with a motion having virtually the same horizontal component with respect to the main frame both in the forward portion and in the rearward portion, but having a greater vertical component in the rearward portion of the main bowl than in the forward portion thereof. The particular movement described is inherent in the particular linkage disclosed in the drawings, but by making the links 63 and 81 members of a parallel link system, for example, the main bowl 61 can be given a uniform motion throughout in response to the jack-knifing motion of the main frame. Various relationships of movement are possible with the linkage mechanism of the type shown, depending upon the location of the pivot points and the length and dispositions of the respective links; however, the precise arrangement disclosed has proved very successful in practice.

When the earth mover is drawn over the ground, and the excavating blade 74 is effective to discharge loosened earth into the main bowl 61, the main bowl eventually is nearly filled and the excavated earth tends to roll forwardly and to spill out of the main bowl in the direction of advance of the vehicle. To preclude this, and also to assist in retaining and subsequently discharging excavated earth from the main bowl 61, I provide a front apron 91 which preferably includes a curved plate 92 having angle reinforcements 93 and 94 thereon and having an edge reinforcement 96 for approximate contact with the cutting blade 74. The apron is stiffened on each end by a plate 97 having an arcuate contour 98 approximately fitting the arcuate contour 99 of the adjacent forward edge of a side plate 68. Supporting arms 101 and 102 extend from junction with the plate 92 and the side plate 97, respectively, to pivot pins 103 which are at the center of the arc of the edges 98 and 99. The pins 103 are mounted in plates 104 extending upwardly from the side plates 68 and stiffened by diagonal braces 106 engaging the plate 104 and the spanning beam 77.

Secured to each of the arms 102 is a bell crank plate 107 joined by a pivot pin 108 to a plunger 109 projecting from an hydraulic cylinder 111. The cylinder is mounted by a pivot connection 112 between an extension 113 on the end of the cylinder and an upstanding portion 114 forming part of the plate 104. Since the cylinders 111 on each side of the earth mover are connected together for operation in unison, when hydraulic fluid is appropriately supplied to them the plungers 109 are forced out of the cylinders 11 and, through the bell crank plates 107, rotate the arms 102 in an anti-clockwise direction, as seen in Fig. 1, about the pivot pins 103. This raises the front gate 91 and retracts the plate 96 from the cutting edge 74, allowing earth to move from the outside of the structure into the main bowl or, in the event the main bowl is filled, permitting earth to move from the main bowl over the cutting edge 74 to discharge.

In order to facilitate the discharge of earth from the main bowl, and especially to force earth therein to discharge at a selected rate and at appropriate times, I preferably provide the main bowl 61 with a rear wall in the form of an earth barrier 116 or earth abutment constituted preferably by a generally planar transverse plate 117 having a forwardly turned lower edge 118 constituting the reinforcement for a curved plate 119, so that the transverse structure is relatively stiff, such stiffness being augmented by reinforcing channels 121 arranged both vertically and horizontally across the rear face of the plate 117. The earth barrier is supported in position largely by a pair of rollers 122, pivotally mounted on brackets 123 projecting from the plate 117 and operating within the inturned reinforcing channels 76. In addition to the support afforded by the rollers 122, the barrier is likewise supported and especially is advanced and retracted by a hydraulic mechanism. This includes a plunger 124 the forward end of which is detachably secured in a socket 126 by a pin 127, the socket being connected to the barrier 116 by suitable mounting plates 128 joined to attaching and reinforcing channels 129.

The plunger 124 operates in a hydraulic cylinder 131 extending rearwardly between the wheels 18 and supported on a frame plate 132 which is joined to the transverse members 72 and 77. When hydraulic fluid is admitted to the cylinder 131, the plunger 124 is expelled therefrom and the earth barrier 116 is moved forwardly within the main bowl 61 to expel the contents thereof. The earth barrier is partially supported, particularly in the fully expelled position of the plunger, by the rollers 122, so that its movement is free and uncramped.

In order to prevent any transverse cocking or twisting of the earth barrier, and to avoid the necessity of making the attachment between the socket 126 and the plunger 124 unduly rigid, I provide means for maintaining the transverse alignment or parallelism of the earth barrier. This means preferably includes a pair of cables 136 and 137, especially illustrated in Figs. 5 and 6. Each of the cables 136 and 137, for example, at its forward end passes through an aperture 138 in the side plate and is connected through a turnbuckle mechanism 139 to an anchorage 141 on the exterior of the side plate. Each of the cables extends rearwardly adjacent the channel 76 and, passing around the end of the plate 117, runs over a pulley 142 suitably journaled in ears 143 projecting from the rear side of the reinforcing member 121.

Figure 5:
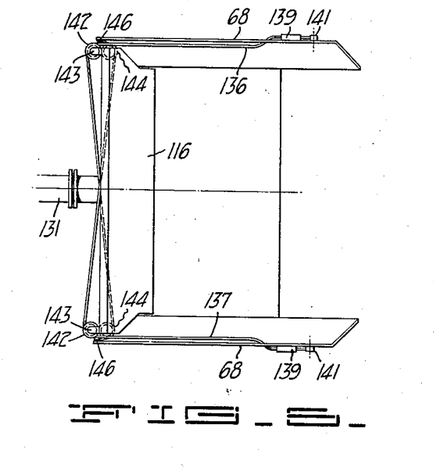
Fig. 5 is a schematic plan of the earth mover with the barrier member in one position.
Figure 6:
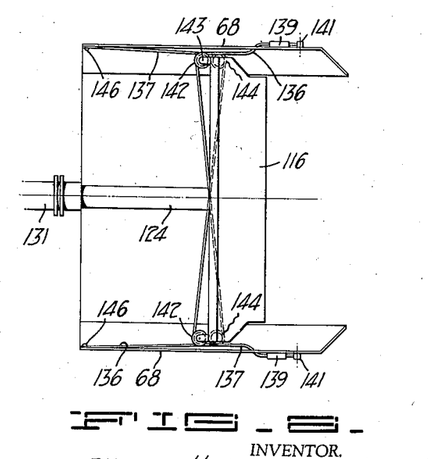
Fig. 6 is a schematic figure, similar to Fig. 5, yet showing the earth barrier in another position.

Each of the cables then extends transversely across the rear face of the earth barrier and in a somewhat downward direction, to run over a comparable pulley 144 rotatably mounted on the rear face of the earth barrier 116, and terminates in an anchorage 146 on the interior face of the adjacent side plate 68. The operation of the cables 136 and 137 is to prevent any tendency toward transverse misalignment of the barrier accompanied by slight rotation of the barrier about a vertical axis centered on the plunger 124. In this fashion the barrier is kept at transverse parallelism or alignment without undue strain upon the plunger.

The hydraulic system for effectuating the movement of the various instrumentalities of the earth mover under control of the operator is preferably constructed in accordance with the showing in Figs. 10 to 18 inclusive. The working fluid is preferably oil, a body of which is contained in a reservoir or tank 151 suitably located for replenishment from time to time through an atmospheric vent and filler cap 152. A conduit 153 leads from the tank through a check valve 154 to the inlet 156 of a positive pressure pump 157, preferably a meshing gear pump suitably driven by the tractor 6. As the pump rotates, it withdraws hydraulic fluid through the conduit 153 and expels it at an elevated pressure into a conduit 158, the amount of the pressure being indicated by a gauge 159 appropriately located for easy perusal by the operator of the tractor 6. A set or definite pressure is maintained in the discharge conduit 158 by the provision of a relief valve 161 in a bypass conduit 162 which leads from the discharge conduit 158 back to the tank 151. The relief valve 161 can be set at any selected pressure, for example a pressure in the neighborhood of 1,000 lbs. per square inch, so that, despite variations in speed of operation of the pump 157, or variations in demand upon the hydraulic system, the effective working pressure is kept approximately at the set value.

In order to provide a reserve or cushion to prevent undue fluctuations in pressure incident to relatively heavy demand by operation of the hydraulic mechanism, and in order, further, to permit the utilization of a pump of relatively small capacity, I preferably provide a means for storing, under relatively high pressure, a quantity of working fluid, and for that reason connect to the bypass conduit 162 one or more reservoirs 163 and 164. These are tanks able to withstand high pressure and are connected by conduits 166 and 167, respectively, to the bypass pipe. When the pressure in the system in general is below the maximum set by the valve 161, the pump discharges either into the actuating cylinders or into the storage tanks 163 and 164. These tanks 163 and 164 are not at any time entirely filled with hydraulic fluid, but are so located that an air cushion exists in the upper portion thereof which acts as a cushion or spring to maintain the requisite pressure upon the working fluid. When the pressure in the system arrives at the set maximum amount, further discharge by the pump 157 is returned to the tank 151, while when a relatively heavy demand for operating fluid comes upon the system, the tanks 163 and 164 are partially discharged to augment the discharge capacity of the pump 157.

Figures 14, 15:
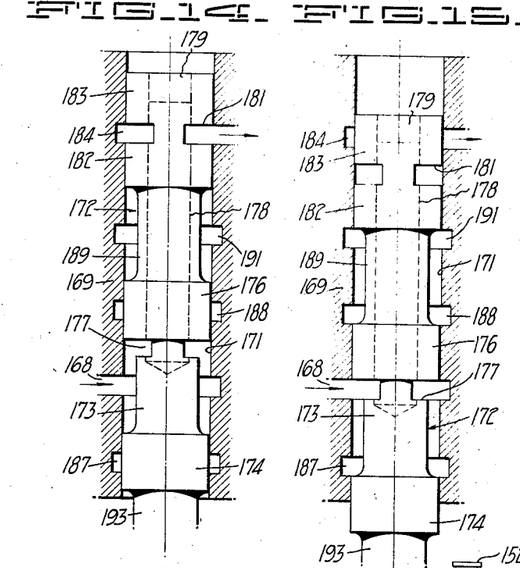
Fig. 14 is a diagrammatic cross-section of a hydraulic valve in one extreme position.
Fig. 15 is a diagrammatic cross-section of a hydraulic valve in an intermediate position.
Figure 16:
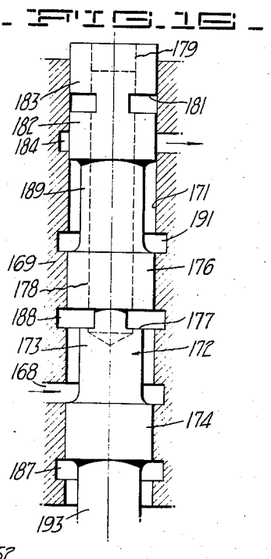
Fig. 16 is a diagrammatic cross-section of a hydraulic valve in another extreme position.
Figure 17:
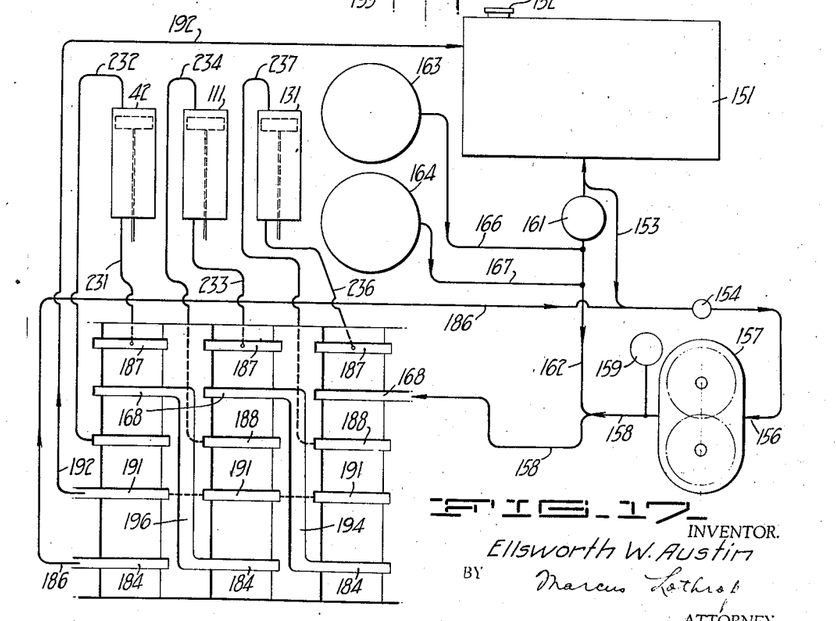
Fig. 17 is a schematic piping diagram of the hydraulic circuits used in my earth mover.

From the discharge conduit 158 the pressure working fluid is led to a series of valves which are utilized for the control of the hydraulic cylinders, and in order to simplify the disclosure the valves are illustrated diagrammatically in Figs. 15 to 17, inclusive. Each of the actuating cylinders, such as 42, has its own controlling valve, and since all of the valves are identical they are described primarily in connection with Figs. 14, 15 and 16 wherein their fundamental characteristics are diagrammatically illustrated. For example, the pressure conduit 158 leads to an inlet port or groove 168 in a valve body 169. This groove or port is annular and encompasses a valve cylinder generally defined by a circular wall 171 within the body 169. Adapted to move axially or to reciprocate within the body 169 is a valve bobbin 172 of generally cylindrical configuration and having a contour to afford communication between different parts of the hydraulic system for different positions of the valve.

For example, the valve in Fig. 14 is in such a position that pressure fluid from the port 168 flows around the reduced portion 173 of the valve bobbin but is restrained from further flow within the bore by lands 174 and 176. The fluid flows radially through passages 177 into a central bore 178 piercing the valve bobbin and extending for a portion of its length, being closed off at its end by a plug 179. Pressure fluid flowing through the passage 178 leaves through radial openings 181 between lands 182 and 183. The fluid then flows into an annular port or groove 184 in the body 169, from which it leaves through a conduit 186, to re-enter the inlet conduit 153 for recirculation by the pump 157. There is thus maintained a continual flow of fluid through the valve bobbin 176 when it is in the neutral position shown in Fig. 14.

When the valve bobbin is axially translated into an actuating position, as shown in Fig. 15 for example, the pressure fluid which enters through the port 168 and which previously has been flowing through the internal passage 178 is precluded longer from flowing therethrough since the opening 181 is no longer in registry with the port 184 but rather is in registry with the inner cylindrical wall 171 of the body 169. With the displacement of the valve bobbin, the land 174 has been moved to uncover an annular port 187 in the body 169, which receives the entire inflow from the conduit 168 and directs it into one end of the hydraulic chamber controlled by the valve.

The addition of fluid to one end of the chamber displaces the double-acting piston therein, so that fluid from the other end of the chamber on the other side of the piston is displaced and flows back to the body 169 through a port 188 which is annular in configuration and which is uncovered by the land 176 in the displaced position of the valve. The fluid passing through the port 188 flows along the reduced portion 189 of the bobbin 172 and enters an annular port 191 which is connected with a discharge conduit 192 leading back to the reservoir 151. Fluid which is released from the actuated cylinder is not returned to the pump 157 directly, but rather is returned to the reservoir 151. The discharge line 192 has therefore very low frictional characteristics, so that discharge of fluid from an actuated cylinder takes place very rapidly.

A displacement of the bobbin 172 in an opposite direction from the neutral position is illustrated in Fig. 16 wherein the land 174, instead of being moved below the port 187, is moved to a position above that port. In this position, working fluid entering through the port 168 and passing around the bobbin to enter the internal passage 178 through the opening 177 is prevented from escaping from such passage since the opening 181 is in registry with the interior cylindrical surface of the bore 171. However, there is communication between the inlet port 168 and the port 188 which is uncovered by the land 176, so that pressure fluid is introduced into one end of the connected actuating cylinder through the port 168. Discharge from the other end of the actuating cylinder is into the port 187 and thence around a reduced portion 193 of the valve bobbin to the discharge pipe 192 and back to the reservoir 151.

By suitably displacing the valve bobbin 172 in either direction from neutral position, the operator can control the flow of hydraulic fluid in such a manner as to cause a corresponding displacement of the piston within the connected hydraulic actuating chamber and thus produce an appropriate movement of the connected instrumentality of the earth mover. There is a continuous flow through the valve unit when the valve bobbin is in neutral position, in order to maintain the lines free of air and in quick-operating condition, and likewise there is provided an arrangement in which the discharge of fluid is relatively free for quick operation.

Preferably, the arrangement of the ports is such that when all of the valve bobbins are in neutral position the high pressure working fluid flowing through the conduit 158 and entering into the passage 168 of the first valve bobbin, as seen in Fig. 17, passes through the hollow center of such bobbin, discharging from the opening 184 and, instead of going directly back to the reservoir 151, rather flows through a transfer passage 194 to enter the port 168 of the next valve. The oil flows through the hollow center of such valve and discharges from its corresponding port 184 through another transfer passage 196 to the port 168 on the third valve, flowing then through its hollow center and leaving the third valve port 184 and through the return line 186 to the pump 157. As soon, however, as one of the bobbins is displaced, this serial circulatory flow is interrupted and the operation of each individual valve is as described in connection with Figs. 14 to 16 inclusive.

While this general arrangement is readily applicable to the operation of any number of cylinders to be actuated, in its present installation there are three major instrumentalities to be moved, one of which is provided with a pair of cylinders, hence three valves are utilized, grouped in a unit.

The controlling instrumentality for the valve unit includes a casing 198 mounted on a suitable part of the tractor 6 and having a cable 199 extending to a suitable anchorage on the valve casing 169 which is mounted on the forward portion 14 of the main frame of the drawn vehicle. The flexible cable 199 forms a support and anchorage for a plurality of flexible control shafts, collectively designated 201, each of which extends from an appropriate connection in the housing 198 to a gear with which meshes a larger gear operated by a handle 202. This general subject-matter is disclosed in my Patent 2,204,033.

The flexible shafts 201 are held to the cable 199 by appropriate supporting clips 203, and each of them terminates in a fitting 204 fastened to the housing 169. Since the three controlling valves are all alike, a description of one will suffice. Any number of valves can be provided, depending upon the number of instrumentalities to be controlled. The flexible shaft 201 extends to a rotatable screw 206 which revolves within an anti-friction bearing 207, held in place against axial movement in the housing 169 by the fitting 204. The fitting 204 can be removed for removal of the screw and disconnection of the shaft 201 therefrom. The threaded portion 208 of the screw is in engagement with a hollow nut 209, one end of which is fastened by a pin 211 to a valve bobbin 172 as previously described. The hollow nut on its exterior surface is provided with a plurality of longitudinal splines 212 operating in mating splines 213 within the body 169 to preclude any rotation of the nut or valve bobbin but to permit free axial movement thereof. Thus, as the shaft 201 and the screw 208 are rotated, a corresponding axial translation is imparted to the valve bobbin.

The valve bobbin is urged toward its neutral or central position, and oil leakage is largely precluded, by a double-acting spring-pressed packing, generally designated 214, which includes a cup leather 216 in engagement with the interior bore of the housing 169 and urged against a thrust washer 217 abutting a ledge 218 in the housing by a coil spring 219. The other end of the coil spring abuts a circumferentially flanged and pierced cup 221 which in one position is in abutment with the valve bobbin 172 and also with the end of the valve cylinder body 169. When the valve is in neutral position, the spring 219 urges the thrust washer 217 against an enlargement on the hollow nut 209 and against the shoulder 218. Likewise, it forces the cup 221 against the end of the body 169 and against the end of the bobbin 172. If the bobbin moves to the right in Fig. 10, for example, the spring 219 is compressed, while if the bobbin is moved to the left in Fig. 10 the thrust washer 217 is likewise moved to the left and compresses the spring 219. Thus the bobbin is yieldingly urged into its neutral or median position. At the same time the cup leather 216 is effective to seal against oil leakage, although whatever leakage does take place past the cup leather is useful in lubricating the screw 208. Screw passages 222 permit equalizing oil and air flow.

Figure 11:
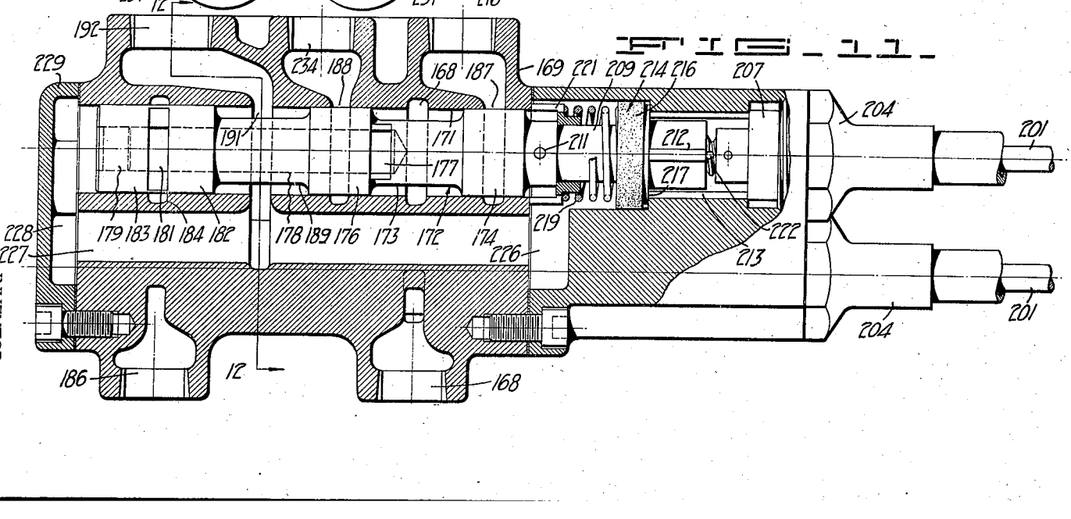
Fig. 11 is a cross-section in the plane of which is indicated by the line 11—11 of Fig. 10.
Figure 12:
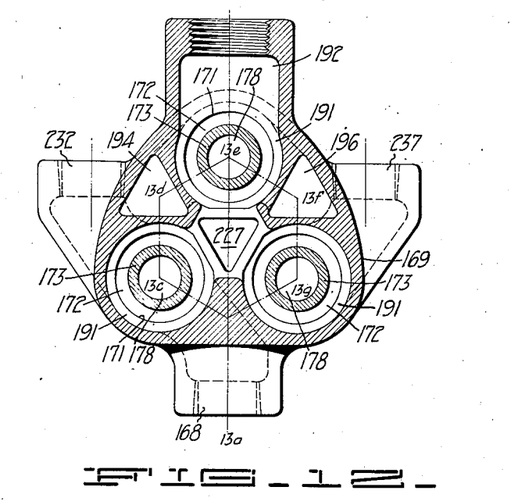
Fig. 12 is a cross-section the planes of which are indicated by the lines 12—12 of Fig. 11.
Figure 13:
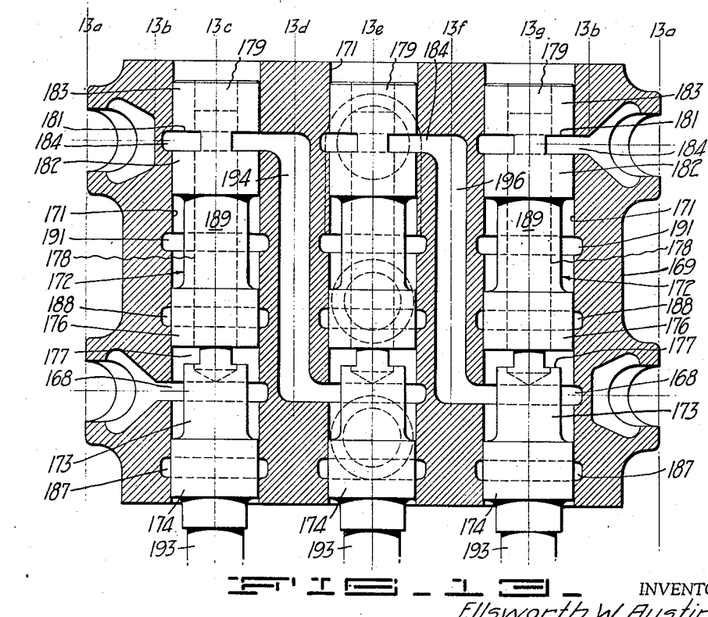
Fig. 13 is a developed cross-section the planes of which are indicated by the lines 13a—b—c—d—e—f—g—b—a of Figs. 12 and 13.

Within the body 169, especially as shown in Fig. 11, the working fluid pressure conduit 158 is connected to the inlet passage 168 which is a passage extending to all three of the valve cylinders located in the body 169, and terminates in a port entirely surrounding each of the valve cylinders 171. In the neutral position of the valve shown in Fig. 11, the fluid which flows into the port 168 surrounding the valve passes into interior channel 178 through ports 177, discharges through ports 181 into the annular port 184 which is in communication with and substantially surrounds its respective one of the valve bodies, and in turn merges with the inlet port 168 of the next valve and so on, finally communicating with the duct 186 through which the fluid returns to the inlet of the pump. When the valve bobbin is displaced to the left, for example from the position shown in Fig. 11, so that the port 187 leading to one end of the cylinder mechanism is uncovered, then the return flow from such cylinder courses over the end of the bobbin and out through the pierced cup 221 into a central chamber 226 which communicates with all three of the valve mechanisms and likewise communicates with a central passage 227 extending through the casing 169.

At its opposite end the passage 227 opens into a chamber 228 formed by a closure cap 229 seated upon the casing and likewise communicating with the otherwise open end of each of the three valve bobbin bores, to return any leakage and to equalize the pressure on the bobbin ends. The central passage 227 communicates with the port 191 of each of the three valve cylinders, so that they all finally lead to the conduit 192 extending back to the fluid reservoir. Thus, when the bobbin is displaced to the left in Fig. 11, flow is from one of the hydraulic chambers through the port 187, around through the pierced cup 221, thence through the chamber 226 into the central passage 227, from which flow takes place through and around the port 191 into the conduit 192. During this time the pressure fluid from the conduit 158 and the port 168 is flowing around the reduced portion 173 of the bobbin and thence flows into the port 188 (see Fig. 15) and into a suitable conduit to the other end of the respective hydraulic chamber.

As disclosed diagrammatically in Fig. 17, for example, the left-hand valve 174 is connected by a conduit 231 extending from the port 187 to one end of the hydraulic chamber 42, for example, while a conduit 232 extends from the other end of the chamber 42 to the port 188. Comparably, a conduit 233 extends from the port 187 of the middle valve 174 to one end of each of the pair of chambers 111, while the branch conduit 234 extends from the other end of each of said pair of chambers 111 to the port 188 of the middle valve 174. In the same fashion, the conduit 236 extends from the port 187 of the right-hand valve 174 of Fig. 17, to one end of the chamber 131, while the conduit 237 extends from the other end of such chamber 131 to the port 188 of the right-hand valve 174.

The hydraulic arrangement is therefore such that it is remotely controlled by the operator of the tractor 6 in such a fashion that each valve is suitably actuated by the operator to provide a corresponding movement of the hydraulic chamber which actuates the earth-moving mechanism and so that the high-pressure working fluid is maintained relatively free of air or gas and in rapid circulation to produce the desired quick actuation of the moved unit.

Figure 19:
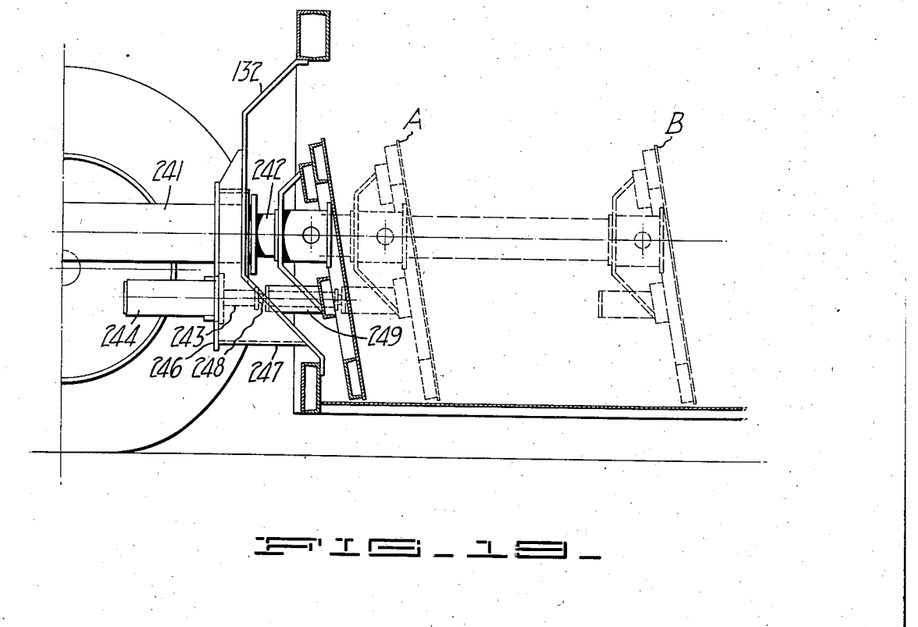
Fig. 19 is a cross-section, similar to Fig. 3, showing a modified jacking arrangement for the earth barrier.

The hydraulic arrangement may also be modified so that other instrumentalities than the front apron are movable by more than one jack, as shown in Fig. 19. It is an advantage to move the earth barrier quickly, but it is necessary to have a very large thrust initially available to start a full load of material out of the main bowl. These requirements are well met by mounting on the frame plate 132 a hydraulic cylinder 241 which has the same stroke as, but a lesser diameter than, the cylinder 131. A plunger 242 operates in the cylinder 241 and is connected to the socket 126. For a given rate of flow of hydraulic fluid, the plunger 242 reciprocates the barrier 116 considerably faster than does the plunger 124, but for a given pressure of hydraulic fluid is capable of exerting less total thrust. I have found that the total thrust necessary to move a load out of the main bowl after it has been once started is considerably less than that needed to move the load initially, and hence choose the diameter of the cylinder 241 and the pressure of the hydraulic fluid so that the force available is adequate to move the load after it has been started but is insufficient to start the load.

In order to supplement the plunger 242, I provide a plunger 243 operating in a cylinder 244. This is mounted on a plate 246 supported on the plate 132 by a spacing member U-shaped in cross-section and welded to the adjacent members. An adjustable terminal 248 on the plunger is adapted to contact an abutment 249 which is welded to the mounting plate 128 and a channel 129 included in the earth barrier.

The cylinder 244 is hydraulically connected in parallel with the cylinder 241 so that when the barrier is in the position shown in full lines in Fig. 19, both plungers 242 and 243 are effective to move the barrier initially with great power although relatively slowly. As soon as the barrier arrives in the position A shown in dotted lines in Fig. 19, the plunger 243 has reached the end of its travel and is no longer effective, but the barrier continues for the remainder of its travel into the position B under the urgency of the plunger 242, which moves at a faster rate as soon as the supply of hydraulic liquid to cylinder 244 ceases. When the hydraulic flow is reversed, the parts return to their retracted positions.

Figure 7:
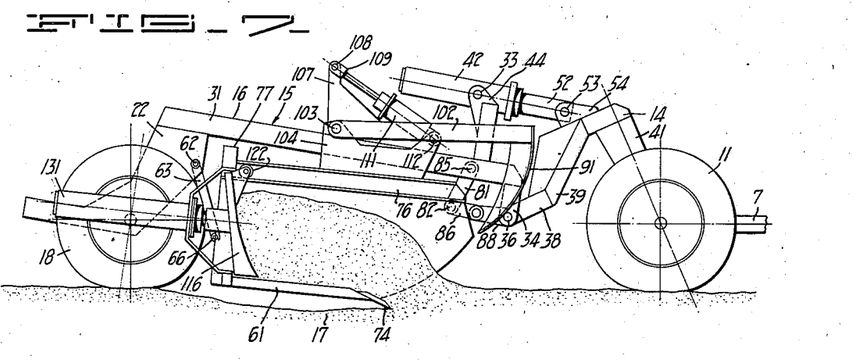
Fig. 7 is a schematic cross-section showing the earth mover in one position.
Figure 8:
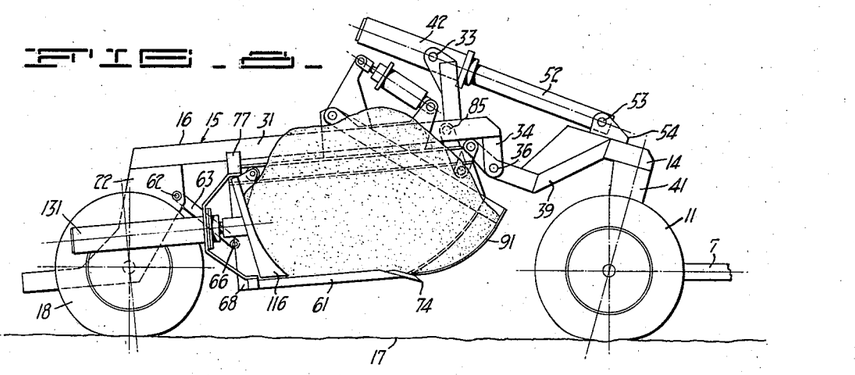
Fig. 8 is a schematic cross-section showing the earth mover in another position.
Figure 9:
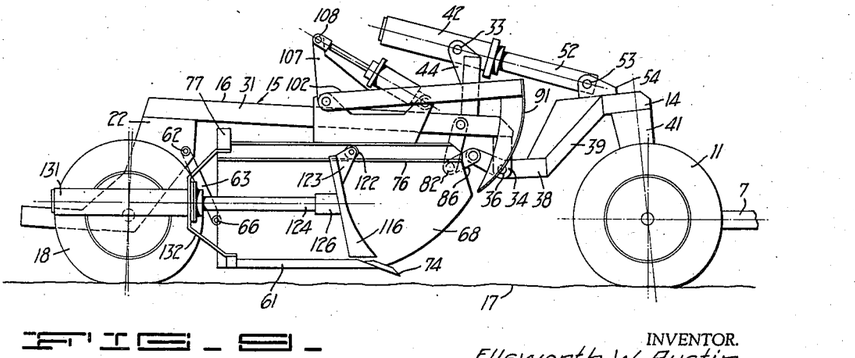
Fig. 9 is a schematic cross-section showing the earth mover in still another position.
Figure 10:
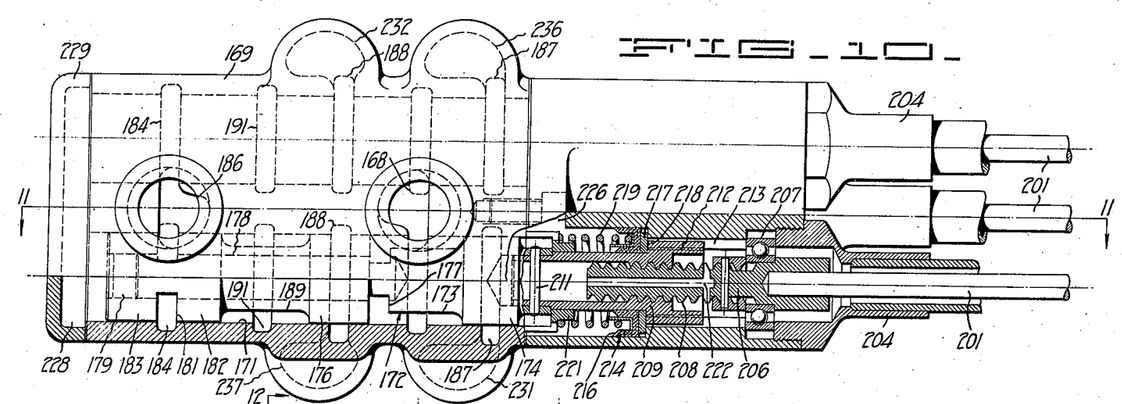
Fig. 10 is a bottom plan view of the hydraulic valve arrangement, a portion being broken away to show the valve actuator in cross-section.

The general utility of the earth mover described herein is at least partially illustrated by the sundry positions into which the structure can be placed by the operator at will, as particularly illustrated in Figs. 1, 7, 8 and 9. In Fig. 7, for example, the structure is actuated so that the main frame is jack-knifed downwardly to a great extent and the front apron is raised, so that the main bowl is disposed for the most part below the general surface of the ground with the cutting edge taking a large cut in the terrain. The cut earth is loaded into the main bowl and against the retracted earth barrier or rear gate. When the structure has been operated in this fashion for some time, partially to fill the bowl, the front apron is dropped to a position slightly spaced from the cutting edge in order to catch the forward spill or roll of the additionally excavated earth. When a capacity load has been introduced into the main bowl, the front apron is closed completely and the main frame is substantially leveled, as shown in Fig. 1, so that the structure is in condition to carry a capacity load of excavated material. The position shown in Fig. 1 is adequate where the material to be carried is transported over a relatively even surface; but in the event the going is rough and undulatory, the frame can be jack-knifed upwardly into substantially the position shown in Fig. 8 to afford a very large clearance, not only of the main portion of the bowl but also of the rear part thereof. When the load is to be discharged, the front apron is lifted and the rear barrier is moved forwardly to expel the load, with the main frame preferably in the position shown in Fig. 9, after which the structure is returned to its original position for further excavation.

I claim:

1. An earth mover comprising a main frame having a forward portion and a rearward portion pivoted together, ground-engaging means for directly supporting said main frame, a main bowl, links of variable length for supporting one end of said main bowl on said rearward portion, links for supporting the other end of said main bowl on said main frame, and means for moving said frame portions with respect to each other and with respect to said main bowl.

2. An earth mover comprising a main frame including a front frame portion, a rear frame portion, and means for pivoting said portions together on a transverse axis, wheels directly supporting said front frame member, wheels directly supporting said rear frame member, a main bowl, links pivoted to said main frame and to said main bowl for supporting one end of said main bowl on said main frame, links pivoted to said main frame and to said main bowl for supporting the other end of said main bowl on said main frame, and means for moving said main bowl with respect to said main frame in accordance with the movement of said pivoted portions.

3. An earth mover comprising a forward ground-engaging means, a forward main frame portion mounted to pivot on said forward ground-engaging means, a rearward ground-engaging means, a rearward main frame portion mounted to pivot on said rearward ground-engaging means, means for joining said portions to pivot about a transverse axis, means for holding said portions in any selected pivotal position, a main bowl, links depending from said rearward main frame portion, and means for moving said main bowl on said links in accordance with relative pivotal movement of said portions.

4. An earth mover comprising a frame ground-supported adjacent its ends and articulated between its ends to pivot about a transverse axis, means for holding said frame in any selected articulated position, an earth-carrying means, links pivoted to said frame and to said earth-carrying means for suspending said earth-carrying means from said frame, and means responsive to pivoting of said frame about said axis for moving said earth-carrying means on said links.

5. An earth mover comprising a forward frame portion, a rearward frame portion, ground-engaging means for directly supporting each of said frame portions, means for connecting said frame portions together for relative pivotal movement on a transverse horizontal axis, means for relatively moving said frame portions about said axis, a main bowl, links pivoted to said bowl adjacent one end thereof and to one of said frame portions, links pivoted to said bowl adjacent the other end thereof and to said one of said frame portions, and links pivoted to said bowl adjacent said other end thereof and to the other of said frame portions.

6. An earth mover comprising a main frame including a forward frame portion and a rearward frame portion, ground-engaging means for directly supporting each of said frame portions, an articulated connection between said frame portions, means for moving said frame portions relative to each other, a main bowl, links pivoted to said main bowl in the rearward portion thereof and to said rearward frame portion, links pivoted to said main bowl in the forward portion thereof and to said rearward frame portion, and links pivoted to said main bowl in the forward portion thereof and to said forward frame portion.

7. An earth mover comprising a forward frame portion, a rearward frame portion pivotally articulated therewith, ground-engaging means for directly supporting each of said portions, a main bowl, rigid bars each pivoted at its one end to said main bowl and at its other end to said rearward frame portion for supporting one end of said bowl on said rearward frame portion, and means for supporting the other end of said bowl to move in accordance with the relative movement between said portions.

8. An earth mover comprising a main frame having a forward portion and a rearward portion pivotally articulated with respect to each other, ground-engaging means directly supporting both of said portions of said main frame, means for moving said forward portion and said rearward portion with respect to each other, a main bowl, rigid bars each pivoted at its one end to said main bowl and at its other end to said rearward portion for constraining said main bowl to movement on a plurality of axes relative to said portion, and means for moving said main bowl on said rearward portion in accordance with relative movement between said forward portion and said rearward portion.

9. An earth mover comprising a frame having pivotally articulated portions each directly supported by ground-engaging means, a main bowl, rigid bars each pivoted at its one end to said main bowl and at its other end to one of said portions for constraining said main bowl to movement on a plurality of axes relative to said portion, and means for moving said bowl on said portion in accordance with the relative movement between said portions.

ELLSWORTH W. AUSTIN.